(12) United States Patent
Kulhavy (10) Patent No.: US 6,336,624 B1
(45) Date of Patent: Jan. 8, 2002

(54) ADJUSTABLE LENGTH COLUMN/SUPPORT

(75) Inventor: Sava Kulhavy, St. Gallen (CH)

(73) Assignee: Cabex AG, Vaduz (LI)

( * ) Notice: Subject to any disclaimer, the term of this patent is extended or adjusted under 35 U.S.C. 154(b) by 0 days.

(21) Appl. No.: 09/355,099

(22) PCT Filed: May 15, 1998

(86) PCT No.: PCT/CH98/00203

§ 371 Date: Oct. 18, 1999

§ 102(e) Date: Oct. 18, 1999

(87) PCT Pub. No.: WO99/27276

PCT Pub. Date: Jun. 3, 1999

(30) Foreign Application Priority Data

Nov. 24, 1997 (CH) .............................................. 2712/97

(51) Int. Cl.[7] .................................................. F16F 5/00
(52) U.S. Cl. ..................... 267/64.12; 267/217; 188/300; 277/609; 277/630; 248/161
(58) Field of Search ............................. 267/64.12, 217; 188/285, 286, 289, 300; 248/161; 277/587, 609, 630, 637

(56) References Cited

U.S. PATENT DOCUMENTS

| | | | | |
|---|---|---|---|---|
| 4,844,392 A | * | 7/1989 | Bauer | 248/162.1 |
| 4,969,619 A | * | 11/1990 | Bauer | 248/161 |
| 4,987,826 A | * | 1/1991 | Deppert | 92/168 |
| 5,141,210 A | * | 8/1992 | Bauer | 267/64.12 |
| 5,273,259 A | * | 12/1993 | Bauer | 267/64.12 |
| 5,566,796 A | * | 10/1996 | De Kock | 188/299 |
| 5,863,048 A | * | 1/1999 | Pingel | 277/609 |
| 6,155,575 A | * | 12/2000 | Hawkins et al. | 277/591 |

FOREIGN PATENT DOCUMENTS

| | | | |
|---|---|---|---|
| DE | 3924166 | * | 2/1991 |
| DE | 3700934 | | 7/1998 |
| EP | 0687832 | | 12/1995 |
| GB | 2095363 | * | 9/1982 |
| JP | 05229454 | * | 9/1993 |

* cited by examiner

*Primary Examiner*—Daniel G. DePumpo
*Assistant Examiner*—David A. Divine
(74) *Attorney, Agent, or Firm*—Browdy and Neimark (57) ABSTRACT

The support includes a tubular casing (1), whereby the remaining components of the support are accommodated in the interior of this casing. A stop (15,16) exists at the respective end of the casing. An end piece (12,13) is accommodated in the respective end portion of the casing (1) whereby the outer front surface (22,34) of the respective end piece rests on the assigned stop (15,16). A terminating or closing device (25,26) is assigned to that one side of the respective end piece, which faces the interior of the support, whereby a tubular interior part (10) extends between said terminating devices. A sealing ring (35) is arranged between the front surface (22,34) of the respective end piece (12,13) and the assigned stop (15,16). The outer diameter of this sealing ring (35) before the assemblage of the support is equal to the outer diameter of the remaining components lying in the interior of the support or it is smaller than the diameter of the remaining interior parts.

20 Claims, 5 Drawing Sheets

ADJUSTABLE LENGTH COLUMN/SUPPORT

CROSS REFERENCE TO RELATED APPLICATION

The present application is the national stage under 35 U.S.C. 371 of PCT/SE98/00203, filed May 15, 1998.

BACKGROUND OF THE INVENTION

Technical Field of the Invention

The present invention relates to a support with an adjustable length, which is used particularly for chairs, tables or the like, having an essentially tubular casing, and internal components, whereby at least one annular seal belongs to these components.

Supports of this type are already known. The outer or peripheral surface of the respective end piece is essentially cylindrical. The diameter of this outer surface is somewhat smaller than the inside diameter of the tubular main body of the casing. Consequently, a gap exists between the outer surface of the end piece and the interior surface of the casing. Inside of the support, cavities and channels are carried out, whereby said channels connect the cavities together. Therein is a fluid, i.e. a gas or a liquid, for example oil, and said fluid can stream therein. In order to prevent, that the fluid can leave the casing of the support, seals are placed in the gap between the cylindrical outer surface of the respective end piece and the cylindrical interior surface of the also cylindrical casing.

The pressure of the fluid in the inside of the support can reach extraordinary high values, so that seals of the column in the support must fulfill extraordinary high quality requirements. The respective seal is made as a ring of a yielding material, as for example of rubber or plastic. In the cylindrical peripheral surface of the end piece a circular groove is carried out, in which the sealing ring is partly embedded, so that a part of the sealing ring projects from the groove.

During the assemblage of the known support, the components of the support, to which the end piece with the sealing rings also belong, are put into the casing in the direction of the longitudinal axis. Thereby that one section of the sealing ring, which is protuberant from the groove, glides on and along the interior surface of the casing. If the interior surface of the casing shows unevennesses like ridges, dirt, etc., then the surface of the outer section of the sealing ring, which is protuberant from the ring-groove, can be damaged by said unevennesses. This can affect the quality of the seal of the inside of the support with respect to its surrounding. In order to avoid such a damage for the seals, the interior surface of the casing must be completely smooth and clean. Such a smooth surface can be reached by polishing the inside wall of the casing, for example. Said polishing of the interior surface of the casing is not quite simple and moreover, this polishing is an additional and time-consuming operation. Absolute cleanliness during assembly of the supports is not always easy.

OBJECT AND SUMMARY OF THE INVENTION

The object of the present invention is, to eliminate the mentioned and even further inconveniences of the foreknown supports.

This object is achieved according to the present invention in the case of the support of the generic type mentioned in the beginning of this specification.

In the following, embodiments of the present invention are explained on the basis of the enclosed drawings in more detail. It shows.

BRIEF DESCRIPTION OF THE DRAWINGS

DETAILED DESCRIPTION OF THE PREFERRED EMBODIMENTS OF THE INVENTION

The present support is carried out as a fluid spring. This can be a gas spring or a hydraulic spring, for example, whereby such springs are generally known. The length of such a support can be adjusted and locked.

The support has a casing 1, also called the outer part of this support. The main body 2 of this casing 1 is essentially cylindrical or tubular. On the upper end section of the casing 1 a seat of a chair, the plate of a table or the like is set up.

The support comprises also an equipment 6 for adjustment of the length of the support, whereby this equipment 6 is also situated in the casing 1. For the actuation of this adjusting device 6 a known pressuring bolt 3 goes axially through the first or upper end portion of the casing 1. This pressuring bolt 3 is manually actuable by means of one actuation device (not depicted), which is well known and which is placed out of the support.

That adjusting device 6 comprises a tubular interior part 10, which is placed in the casing 1 or which is put therein. In the inside of this interior part 10, a piston 4 is situated, which is secured to one of the ends of a rod 5. This piston 4 is displaceable and fluid tight embedded in the interior part 10. The piston rod 5 protrudes from the second or lower end portion of the casing 1. This lower end portion of the piston rod 5 can be engaged to the foot of the chair of the table or the like in a manner per se known.

The casing 1 of the support further comprises stops 15 and 16, each one of them being placed in one of the margin areas of the main body 2 of the casing 1. The respective stop 15 or 16 has the shaping of an annular structure, which extends away from the wall 2 of the casing 1 towards the longitudinal axis A of the casing 1. The annular shaped main body 17 of the stop 15 or 16 is approximately semicircular. That outer wall of this convexity 17 is turned away from the inside of the casing 1, so that the interior of this convexity 17 opens towards the inside of the casing 1.

The arched main body 17 of the stop 15 or 16 is limited by two circular and concentrical running edges or flanks in the area of the orifice of the annular interior of the convexity, whereby said flanks are directed towards the inside of the casing 1 or of the interior part 10. Through the first or outside lying flank, the stop 15 or 16 is connected to the main body 2 of the casing 1, because this flank is in one piece with that one margin portion of the casing main body 2, which is here also lying. The arched main body 17 of the stop 15 or 16 extends from the wall 2 of the casing 1 away, in fact towards the axis A. The main body 17 of the stop 15 or 16 is limited in this radial direction by the second flank 18. This inner flank 18 of the stop 15 or 16 stands freely in the casing 1 and it lies in a radial distance from the pressuring bolt 3 or from the piston rod 5. The front surface 19 of this freely standing stop edge 18 lies in one to the axis A vertically standing plane. The stops 15 and 16 can be manufactured by reshaping of the margin portion of the casing 1, for example.

In the respective end portions of the casing 1 and end piece 12 and 13 are placed. The first end piece 12, which is accommodated in the first end in FIG. 1 and 2 above lying end portion of the casing 1, has a main body 31 (FIG. 2), which is carried out as a thick walled piece of tube. In the bore 32 of this piece of tube 31, the pressuring bolt 3 is supported longitudinally displaceable. The diameter of the outer surface 33 of this thick walled tube piece 31 is chosen in such a way, that a gap, which exits between this outer surface 33 and the interior surface of the main body 2 of the outer part 1, is as small as possible. The diameter of the outer surface 33 must be at the same time chosen however so, that the end piece 12 can be moved practically free of clearance in the direction of the longitudinal axis A in the casing 1.

The main body 31 of the first end piece 12 has a first front surface 34, which is directed towards the outside and which is assigned to the first stop 15 at the casing 1. This front surface 34 is essentially flat and annular and it stands vertically to the longitudinal axis A. In that margin area of this first front surface 34, which adjoins to the cylindrical outer surface 33 of the piece of tube 31, a seal 35 is placed, which lies on the front surface 34. This seal 35 is constructed as a ring, the outer diameter of which is in a preferable manner somewhat smaller than the diameter of the outer surface 33 of the piece of tube 31. The cross section of this sealing ring 35 can be circular in the unloaded condition.

The first end piece 12 is placed in the first end portion of the casing 1 in such a manner, that its outer front surface 34 is assigned to the front surface 19 of the free flank 18 of the stop 15. Thereby, the sealing ring 35 is situated in the inside of the convexity 17 of the stop 15. The width or the diameter of the main body of the sealing ring 35 corresponds to the distance between the flanks of the stop 15 or 16. The width or the diameter of the main body of the sealing ring 35 can also be a little bigger than the distance between the flanks of the stop 15 or 16, so that a part of the material of the sealing ring 35 fills the interior in the convexity 17 of the stop 15 or 16. The remainder or rest of the material of the sealing ring 35 is placed, under circumstances, between the front surface 19 of the freely standing flank 18 and the outer front surface 34 of the end piece 12.

The main body 31 of the first end piece 12 has also a second front surface 36, which terminates that one end portion of the end piece 12 which faces the inside of the casing 1. This inner front surface 36 is also flat and annular and it extends also perpendicular to the longitudinal axis A. The end piece 12 stands over this second front surface 36 in contact with the adjusting device 6 already mentioned.

The main body 21 of the second end piece 13, which is accommodated in the second or lower end portion of the casing 1, is constructed as a ring, the thickness of which is smaller than the diameter of the main body 21 or smaller than the length of the main body 31 of the first end piece 12. Through the bore in the main body 21 of the second end piece 13 the piston rod 5 goes through. The diameter the outer surface 37 of this second end piece 13 is chosen in equal manner, as it is previously described in the connection with the outer surface 33 of the first end piece 12. The front surface 22, directed towards the outside, of this second end piece 13 is annular, flat and it stands also at a right angle to the longitudinal axis A. This outer front surface 22 is assigned to the free flank 18 of the second stop 16. The end piece 13 has also a second front surface 48, which is directed towards the inside of the casing 1. In the outer margin area of the outer front surface 22 of this second end piece 13 a second annular seal 35 is placed, which lies in the convexity 17 of this second stop 16, as it was described previously in connection with the convexity of the first stop 15.

The tubular interior part 10 is shorter than the distance between the inner front surfaces 36 and 48 of the end pieces 12 and 13. The adjusting device 6 comprises furthermore terminating devices 25 and 26, respective one of them is assigned to one orifice of the interior part 10 and is in the area of one of the end portions of the casing 1.

The main body 27 (FIG. 1) of the first or upper terminating device 25 is carried out as a thick walled piece of tube. This piece of tube 27 has a first or upper front surface 23 and a second or lower front surface 24, whereby this second front surface 24 opposes the first front surface 23. These front surfaces 23 and 24 stand practically vertically to the longitudinal axis A. The inner front surface 36 of the first end piece 12 rests on the first front surface 23. The second front surface 24 lies in the inside of the interior part 10.

The diameter of the cylindrical outer surface 28 of this terminating device 25 corresponds 1 to the diameter of the interior surface of the casing in such a manner that the terminating device 25 on the one hand sits over its outer surface 28 in the casing 1 as free of clearance as possible and that said terminating device 25 is on the other hand nevertheless displaceable in the casing 1 in the direction of the longitudinal axis A. In order that the gap between the outer surface 28 of the main body 27 and the interior surface of the casing 1 is fluid tight, a sealing ring 29 is placed in this gap.

In the cylindrical outer surface of the main body 27 of said terminating device 25 a circular step 38 is carried out, which begins at the second front surface 24 of the main body 27 and which extends towards the first front surface 23. The length of this step 38 is smaller than the length of the main body 27, so that an annular shoulder 381 exists at that one end of this step 38, which is placed in the interior. This shoulder 381 stands in a right angle to the longitudinal axis A. The diameters of the cylindrical outer surface of this step 38 corresponds to the inner diameter of the tubular interior part 10, so that that one section of the main body 27, having this step, can be put in into the interior part 10. The end surface of that one section of the interior part 10, which lies in this step 38, rests on the shoulder 381 of the step 38. In the gap between the outer surface of the step 38 and the interior surface of the interior part 10 another sealing ring 39 is placed.

In the inside of the first terminating device 25 a valve device 40 is placed, which can be actuated by aid of the pressuring bolt 3. In the inside of the main body 27 of this terminating device 25 a chamber like extension 41 of the bore in the tubular main body 27 is carried out. Through said bore and consequently also through such a chamber 41 the plunger 42 of a valve body 43 goes through. A valve plate 44 is attached at that one end of this plunger 42, which is in the inside of the interior part 10. That one orifice of the bore, which is situated in the interior part 10, is carried out as a valve seat 45, on which the valve plate 44 rests, when the valve 40 is in non actuated condition. On the other end of the plunger 42, the pressuring bolt 3 rests. This section of the valve stem 42 is surrounded by a sealing ring 49, which is placed in the upper area of the chamber 41.

In the main body 27 of this first terminating device 25, a channel 46 is carried out, which stands at a right angle to the longitudinal axis A. This channel 46 leads on the one hand into the chamber 41 and on the other hand into the step 38 in the main body 27. In the outer surface of the interior part 10 a channel 47 is carried out, which runs parallel to the longitudinal axis A and which extends between the both end surfaces of this interior part 10. Consequently, that one end of the channel of 47 in the interior part 10 is connected in terms of fluid through the channel 46 in the main body 27 to the chamber 41 which lies in the step 38 of the main body 27.

The main body 50 of the second or lower terminating device 26 has also the shape of a thick walled piece of tube, whereby the piston rod 5 goes through this piece of tube 50. A considerable clearance is left therebetween. This piece of tube 50 has a first or upper front surface 51 and a second or lower front surface 52. The diameter the outer surface 53 of the main body 50 of this terminating device 26 corresponds to the diameter of the interior surface of the casing 1 in such a manner, that the outer surface 53 of the terminating device 26 sits in the casing 1 as free of clearance as possible and that this terminating device 26 can be displaced in the casing 1 in the direction of the longitudinal axis A.

In the outer surface 53 of the main body 50 a circular step 58 is carried out, which is connected on the one hand to the first or interior front surface 51 of the main body 50, and which extends towards the second or outer surface 52. On this end of the step 58, an annular shoulder 59 exists, which stands practically at a right angle to the longitudinal axis A and which extends between the outer surface 53 of the main body 50 and the outer surface 54 of the step 58. The step 58 is situated in that one section of the main body 50, which is assigned to the interior part 10. The diameter of the outer surface 54 of the step 58 corresponds to the inner diameter of the interior part 10, so that that one section of the main body 50, which is surrounded by said step 58, can be put in into the second end portion of the interior part 10, which lies here. The end surface of the interior part 10 bears thereby against the shoulder 59 of this step 58.

In the wall of the main body 50 an approximately L-shaped channel 55 is carried out. The orifice of one of the legs 56 of this L-channel 55 lies the inner front surface 51 of the main body 50. The orifice of the second leg 57 of the L-channel 55 lies in the step 58 of the main body 50. However, in this step 58 also the second end of the longitudinal channel 47 lies at the interior part 10. Through the valve device 40 and the channels 46, 47 and 55 the fluid can stream from one side of the piston 5 in the interior part 10 to the other side of the piston 5, when the valve 40 is opened.

In this second end portion of the casing 1 also the previously described second end piece 13 is situated. This end piece 13 rests on the front surface 19 of the free flank 18 of the second stop 16 at the casing 1. The end piece 13 and the second terminating device 26 lies on the longitudinal axis A and an annular sealing disk 60 is placed therebetween. The main body of this sealing disk 60 extends between the piston rod 5 and the interior surface of the casing 1 and the outer diameter of this sealing disk 60 is advantageously smaller than the interior diameter of the casing 1.

When this support is manufactured, then one of the end portions of the originally tubular shaped casing 1 is reshaped in such way, that this end portion represents one of the stops 15. This can be reached for example by flanging this end portion of the piece of tube 1. From the other end of the tube 1, the following components in the following order are put in into this tube 1: the first sealing ring 35, the first end piece 12, the first terminating device 25, the interior part 10, the second terminating device 26, the sealing disk 60 and the second end piece 13, whereby these components can be brought into the tube 1 individually or already assembled together. By means of a tubular tool, which surrounds the piston rod 5 and which rests on that one section of the outer front surface 22 of the lower end piece 13, which freely lies between the piston rod 5 and the flank 18 of the stop 16, a pressure is exerted on the components of the support placed in the interior of the casing 1, whereby this pressure is so great, that the first sealing ring 35 is compressed between the first stop 15 and the first end piece 12.

Under the maintenance of the pressure excerted by means of said piece of tube, the casing 1 is closed. This happens in such a manner, that the second stop 16 at this end of the casing 1 arises. This can be brought about by the same type of reshaping of this second margin portion of the tube 1, that was described in the connection with the first stop 15. This second reshaping takes place up to such a depth, that the second sealing ring 35, like the first sealing ring 35, is reshaped. Thereby the front surfaces 19 of the freely standing flanks 18 at the stops 15 and 16 obtain such a distance from each other, that the mentioned inner parts of the support are compressed between these flanks 18.

The first sealing ring 35 is so strongly compressed between the main body 17 of the first stop 15 and the first front surface 34 of the first end piece 12, so that no fluid can leave the support in this region. The second front surface 36 of the first end piece 12 lies rigidly on the first front surface 23 of the first terminating or end device 25. The flange 381 in this device 25 lies rigidly on the first end surface of the interior part 10. The other end surface of this interior part 10 rests rigidly on the flange 59 in the second terminating or end device 26. The sealing disk 60 is compressed so strongly 26 between this second terminating device 26 and the second end piece that it rests fluid tight on the piston rod 5. The second sealing ring 35 is compressed between the second front surface 22 of the second end piece 13 and the second stop 16, so that also here no fluid can leave the support.

Since the outer diameter of all tight members 35 and 60 of this support is smaller than the diameter of the interior surface of the main body 2 of the casing 1, the peripheral parts of these tight members 35 and 69 can not be damaged during the insertion of the inner components of the support into the casing 1 by possible unevennesses on the interior surface 7 of the casing 1. If there are such unevennesses in the casing 1, then they are surrounded and locked up by the material of the tight members 35 and 60 during the mentioned compressing.

Figure 3:
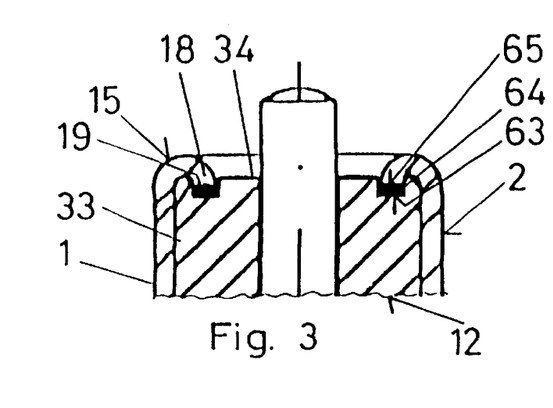

FIG. 3 to 6 show enlarged and in a vertical longitudinal section view details from further embodiments of the present support. In FIG. 3 the first or upper end portion of the support is depicted. The characterising of this end portion can also apply for the second or lower end portion of the support, although these end portions of the support must not be carried out equally. This applies also for all types of the support disclosed in these papers.

According to FIG. 3, a circular groove 63 is carried out in the outer front surface 34 of the end piece 12 from under the front surface 19 of the free flank 18 of the stop 15. The cross section of this circular groove 63 is practically rectangular and the width of the same corresponds to the width of the flank of the stop 15. Under circumstances, the side walls of such a circular groove 63 can diverge towards the orifice of this groove 63, so that the orifice of this circular groove 63 is wider than the bottom of the same. The outer lying, i.e.

that one margin 64 of the circular groove 63, which lies nearer to the outer surface 33 of this end piece 12, is in a distance from the outer surface 33, so that the diameter of this margin 63 is smaller than the diameter of the outer surface 33 of the end piece 12.

A sealing ring 65 lies in the circular groove 63. This sealing ring 65 can have a rectangular cross section. The measurements of this cross section can be chosen in the present case so, that the sealing ring in the nonloaded condition fills out the cross section of the circular groove 6. The sealing ring 65 can have however also a circular cross section. Then, the diameter of the main body of this sealing ring 65 is to be chosen in such a way, that the sealing ring in the loaded condition, i.e. when the support is assembled, fills the cross section of the circular groove 63.

Corresponding statements apply for the second end piece 13 when the outer front surface 22 of this end piece 13 is provided with the described circular groove 63.

Figure 4:
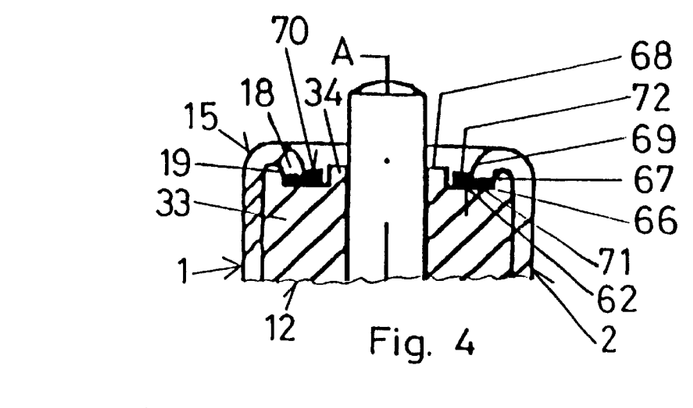

As shown in the embodiment according to FIG. 4, the outer lying front surface 34 of the end piece 12 has also a circular groove 62. The width of this groove 62 is however larger than the width of the front surface 19 on the freely standing flank 18 of the stop 15. For the edge 66 of this circular groove 62, lying nearer to the outer surface 33 of the end piece 12, applies the same, which has been described previously in the context with the outer edge 64. The outer edge 66 of the circular groove 62 is placed according to FIG. 4 so, that it is assigned to that one lateral surface 67 of the free stop flank 18, which is directed towards outwards. The opposite edge 68 of the circular groove 62 is placed under such circumstances in a distance from that one lateral surface 69 of the stop flank 18 which is nearer to the longitudinal axis A.

In the wide circular groove 62 a sealing ring 70 is placed. This can also have, as depicted in FIG. 4, a rectangular cross section. That one dimension of the sealing ring 70, which coincides with the direction of the bottom 71 of the grove, is however shorter than the width of the bottom 71 of the grove, so that a gap exists between the inside edge 68 of the groove 62 and that one lateral surface 72 of the sealing ring 70, which opposes the inside edge 68 of the groove 62.

Figure 5:
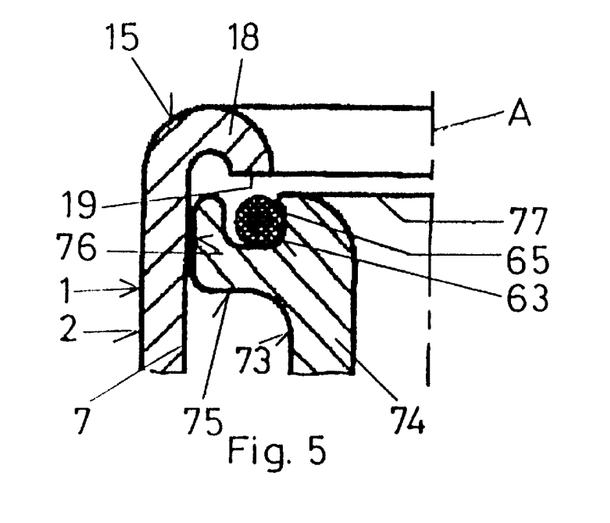

In FIG. 5 another embodiment of one of the end portions of the casing 1 is depicted whereby this end portion is depicted in the not yet assembled condition. Consequently, the free stop flank 18 is still in a distance from the end piece 73 of the support. The middle part 74 of this end piece 73 is slim, so that this central part 74 has a smaller outer diameter and a thinner wall in the middle area of its length than the previously described end pieces. The end section of the central part 74 is provided with a flange 75 projecting from the outer wall of end piece 74. The diameter of the cylindrically shaped outer surface 76 of the flange 75 is chosen in such a way, that the flange 75 is still movable in the casing 1 in direction of the longitudinal axis A. In that one front surface 77 of this flange 75, which is directed towards outside, the circular groove 53 is carried out, which was already described in connection with FIG. 3. The sealing ring 65 lies in said circular groove 53. This sealing ring 65 has a circular cross section.

Figure 6:
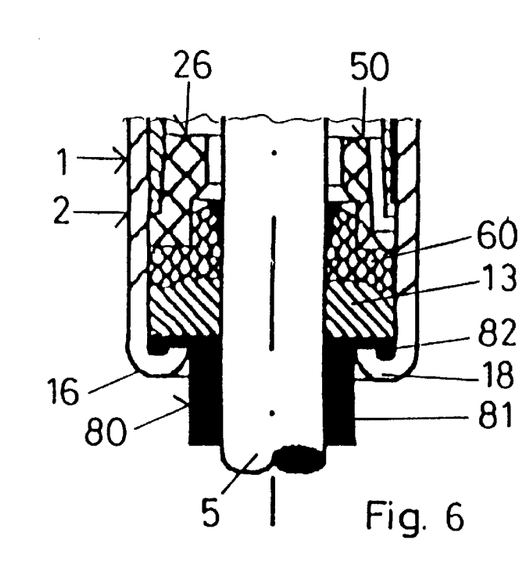

FIG. 6 shows that end portion of the casing 1, through which the piston rod 5 goes through. This end portion contains a seal member 80, the longitudinal sectional view of which is practically T-shaped. The vertical part 81 of this T-shape is carried out as a piece of tube, which lies tightly on the outer surface of the piston rod, so that no fluid can escape along the surface of the piston rod 5 from the interior of the support. The section of the sealing member 80, which runs crosswise, is carried out as a flange 82 projecting radially from the piece of tube 81. The outer diameter of this flange 82 can be somewhat smaller than the diameter of the interior surface of the casing 1. In FIG. 6 the support is shown in the assembled condition, so that the freely standing flank 18 of the stop 1 is pressed in the underside of the flange 82.

Figure 1:
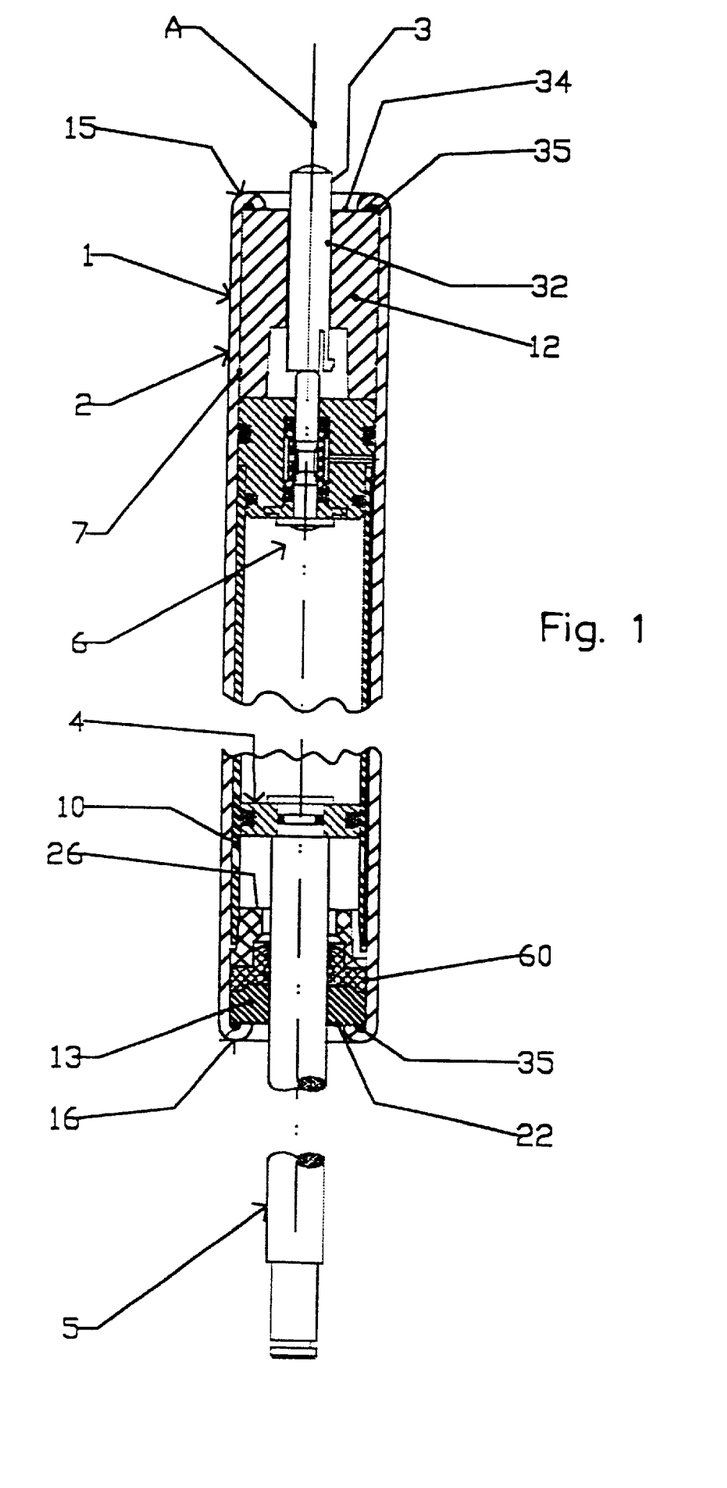
FIG. 1 in a vertical longitudinal sectional view a first embodiment of the present support, whereby this support comprises a tubular outer part, end pieces situated in this tubular part, and terminating devices situated between the end pieces, FIG. 2 enlarged details from FIG. 1, FIG. 3 to 6 enlarged and in a vertical longitudinal sectional view further embodiments of the end pieces, FIG. 7 in a vertical longitudinal sectional view a second embodiment of the terminating device and FIG. 8 enlarged details from FIG. 7.
Figure 2:
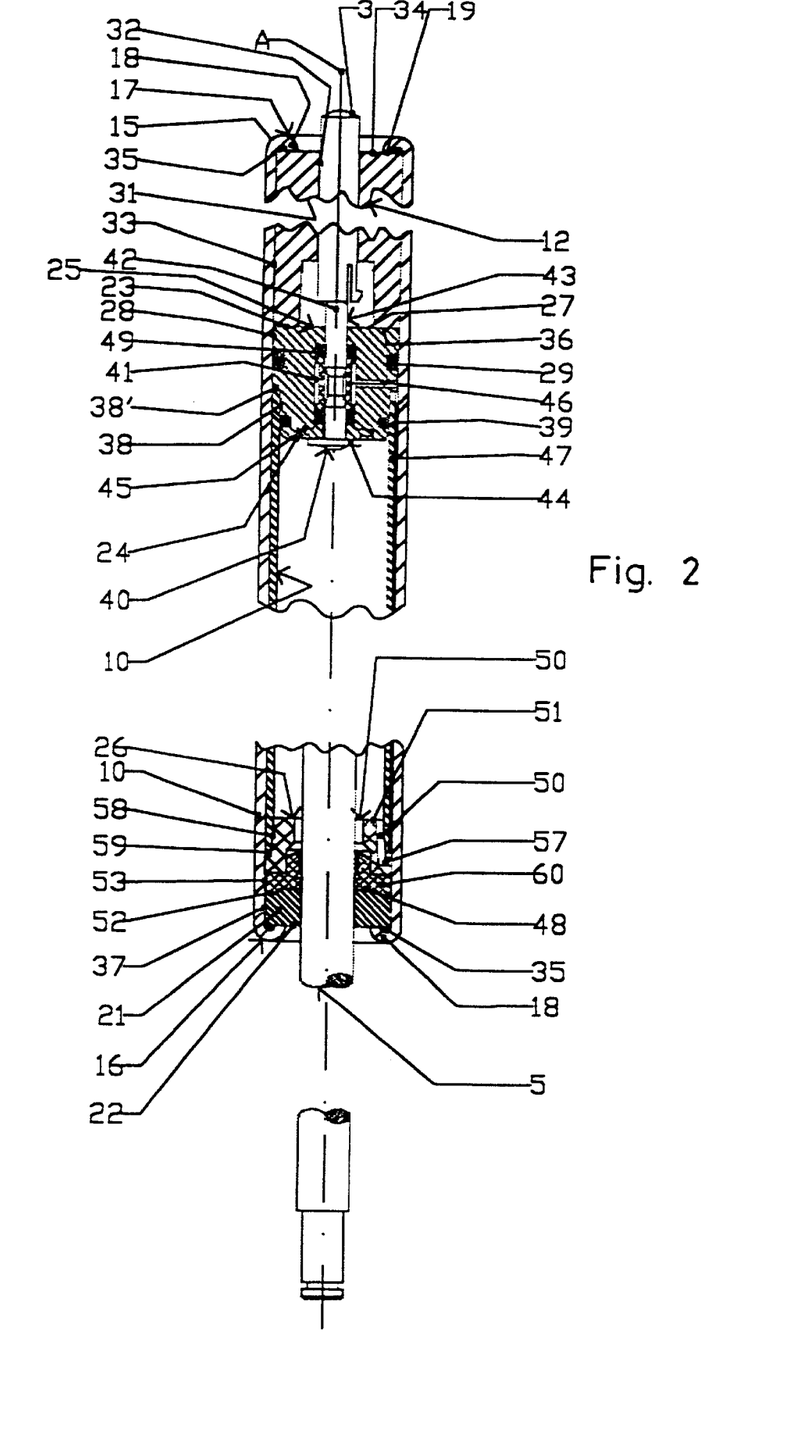
Figure 7:
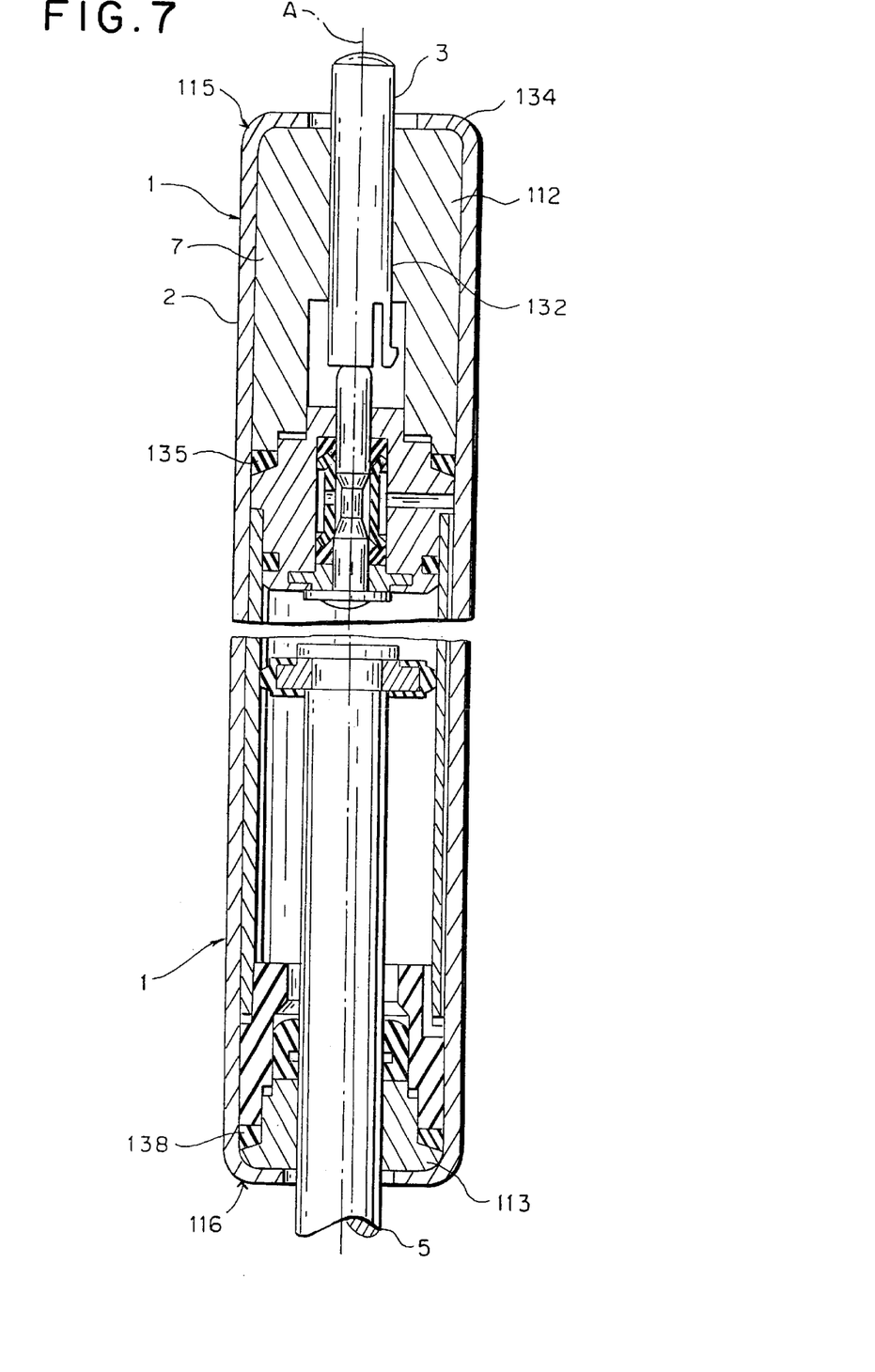
Figure 8:
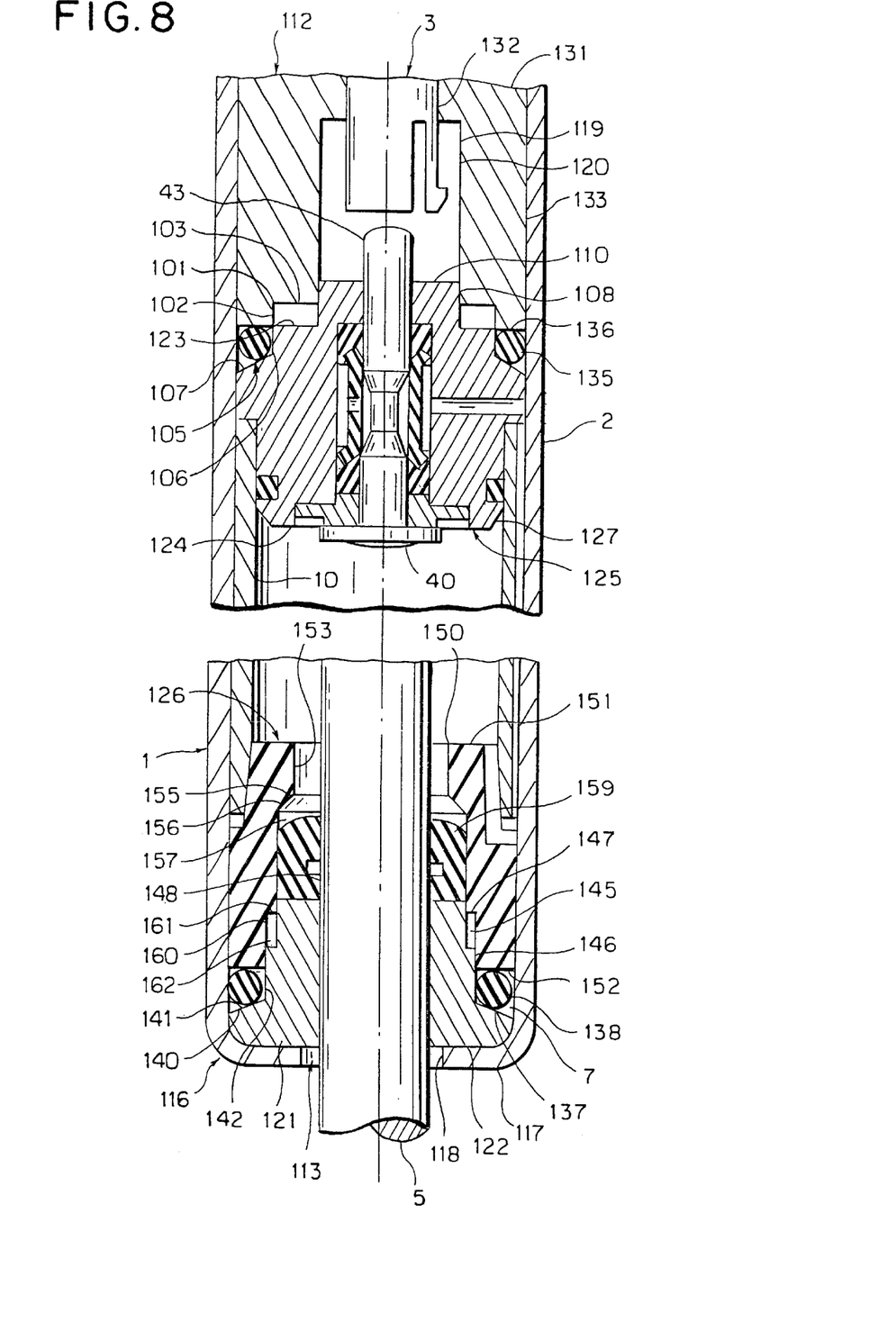

In connection with FIG. 1 and 2, it was described, that during the assembly of the support the inner components of the support can be put in into the casing 17, the interior surface 7 of which is untreated. With this embodiment, which was described as mentioned, the danger exists, that the peripheral part of the sealing ring 29, which protrudes from the outer surface of the main body 27 of the first terminating device 25, can be damaged during the insertion into the casing 1 in the manner already described. This danger does not exist with the embodiment of the present support which is illustrated in FIGS. 7 and 8. FIG. 7 shows the support in the assembled condition. In FIG. 8 the inner components of the support are not yet compressed together.

The casing 1 of the support according to FIGS. 7 and 8 comprises stops 115 and 116, from which each one is placed in one of the margin areas of the main body 2 of the casing 1. The respective stop 115 or 116 has the shaping of a ring, which extends away from the wall 2 of the casing 1 towards the longitudinal axis A of the casing 1. The annular main body 117 of such a stop 115 or 116 is flat and it has two circular and concentrical placed edges. The stop 115 or 116 is connected to the main body 2 of the casing 1 over the first or outwardly lying edge, which has the bigger diameter. This edge is in one piece with that margin portion of the casing main body 2, which is lying here. The main body 117 of the stop 115 or 116 is limited in radial direction by the second edge 118 having a smaller diameter. This second or inner edge 118 stands freely and it lies in a radial distance of the pressuring bolt 3 or from the piston rod 5. Such stops 115 and 116 can be reached for example by reshaping of the margin portions of the casing 1.

In the respective end portion of the casing 1 one of the end pieces 112 or 113 is placed. The first end piece 112, which is accommodated in the first and in FIG. 7 or 8 above lying end portion of the casing 1, has a main body 131 (FIG. 8), which is carried out as a thick walled piece of tube. In the axial running bore 132 of this piece of tube 131 the pressuring bolt 3 is supported longitudinally displaceable. That one end portion of this axial bore 132, which faces the inside of the support, has a cylindrical flaring 120, the longitudinal axis of which also lies on the longitudinal axis A.

The diameter of the outer surface 133 of the thick walled piece of tube 131 is chosen in such a way that a gap, which exists between this outer surface 133 and the interior surface 7 of the main body 2 of the outer part 1, is as small as possible. The diameter of the outer surface 133 must however at the same time be chosen in such a way that the end piece 112 can be moved in the casing 1 practically free of clearance in direction of the longitudinal axis A.

The main body 131 of the first end piece 112 has a first upper plan and towards outwards directed front surface 134, which is essentially annular and which stands vertically to the longitudinal axis A. Over this front surface 134 the end piece 112 rests directly on the interior surface of the upper stop 115.

The main body 131 of the first end piece 112 has also a second, lower front surface 136, which faces the inside of the casing 1. This inner front surface 136 is flat and annular and it runs perpendicular to the longitudinal axis A. In this front surface 136 an annular recess or step 101 is carried out which adjoins to the widening of the bore 120 and which extends from the front surface 136 towards the outer front surface 134. In this sense, this step 101 can be also named as hollow or set back.

This step 101 has walls 102 and 103 standing rectangularly to each other. The first wall 102 is cylindrical and it extends from the inner front surface 136 parallel to the longitudinal axis A towards the other front surface 134. To the end of this cylinder-wall 102, the second wall 103 of this set back step 101 adjoins. This second wall 103 has the shaping of a flat ring, which stands perpendicularly to the longitudinal axis A. The outer edge of this ring wall 103 adjoins to that one end of the cylinder wall 102, which lies in the interior. The inner edge of the ring wall 103 adjoins to the inside wall 119 of the widening 120 of the bore.

The edge of the lower front surface 136 of the first end piece 112, having a bigger diameter, lies in the outer surface 133 of this end piece 112. Because of the step 101 placed in the front surface 136, this front surface 136 is relatively narrow and a first seal 135 is placed before this narrow front surface 136. Said seal 135 is constructed as a ring, the outer diameter of which is in a preferable manner somewhat smaller than the diameter of the outer surface 133 of the piece of tube 131. The cross section of this sealing ring 135 can be circular in the unloaded condition, as it is shown in FIG. 8. The width of the main body of this sealing ring 135 is comparable with the width of the front surface 136.

The main body 127 (FIG. 8) of the first or upper terminating device 125 has the shape of a thick walled piece of tube. This piece of tube 127 has a first or upper front surface 123 and a second or lower front surface 124. These front surfaces 123 and 124 stand practically perpendicular to the longitudinal axis A, whereby the second front surface 124 lies in the inside of the interior part 10.

A circular recess or step 105 is carried out in the area of the outer lying margin of the upper front surface 123 and this recess 105 extends from this front surface 123 towards the inner or lower front surface 124. This step 105 has walls 106 and 107. The first wall 106 is cylindrical and it extends from the inner front surface 123 parallel to the longitudinal axis A towards the other front surface 124. The one end of this cylindrical wall 106 lies consequently in the upper front surface 123. The diameter of the cylindrical wall 106 corresponds to the diameter of the cylindrical wall 102 of the step 101 in the upper end piece 112, so that the part of the main body 127 laterally limited by the cylinder surface 106, can come in into the end piece 112.

To the other end of the cylinder wall of 106, lying in the interior of the main body 127, the second wall 107 of this outer, annular step 105 adjoins. This second wall 107 has the shaping of a flat ring and it forms with the longitudinal axis A an angle, which is smaller than 90 degrees, whereby this wall 107 falls towards the outside. The outer edge of this ring-wall 107 lies in the outer surface of this main body 127. The sealing ring 135 is placed between this ring-wall 107 and the lower front surface 136 of the upper end piece 112.

When the inner components of the present support are put in into the casing 1, then the sealing ring 135 lies first, i.e. not yet compressed, between the two mentioned surfaces 107 and 136, so that its outer surface comes scarcely in contact with the interior surface 7 of the casing 1. When the inner components of the support are then compressed, the sealing ring 135 is compressed between the surfaces 107 and 136. Thereby the cross section of the sealing ring 135 changes roughly in a manner, apparent from FIG. 7. The material of the sealing ring 135 fills out completely a space, which is limited by the surfaces 7,106,107 and 136. The enclined surface 107 favours thereby the flow of the material of the sealing ring 135 towards the interior surface 7 of the casing 1. Thereby the desired seal in terms of fluid of the inside of the support against the surrounding is reached at this end area of the support.

In order that the upper front surface 123 of the main body 127 of the upper terminating device 125 can come into the recess 101 in the upper end piece 112 during the compressing of the interior support components in trouble-free and clean condition, the main body 127 is provided with a leading projection 110. This projection 110 rises over the upper front surface 123 of the main body 127 and it has a cylindrical outer surface 108. The longitudinal axis of this outer surface 108 lies on the longitudinal axis A. The diameter of this outer surface 108 is chosen in such a way, that this projection 110 fits into the widening 120 of the bore. The height of this projection 110 or of the cylinder wall 108 of the same is bigger than the height of the cylinder wall 102 of the recess 101 in the end piece 112. During the compressing of the interior parts of the support, said projection 110 enters first the widening 120 of the bore, so that the main body 127 is already led by the projection 110 when the front surface 123 and the front surface 136 meet together.

The main body 121 of the second end piece 113, which is accommodated in the second or lower end portion of the casing 1, is constructed as a piece of tube having steps which are circular, concentrically placed and projecting. Through the bore in the main body 121 of the second end piece 113 the piston rod 5 goes through. The widest area of this main body 121 is represented by a flange, which is placed in the lower end area of the main body 121. This flange rests directly and extensively through its annular front surface 122, which is directed towards the outside, on the interior surface of the stop 116 situated here. Said front surface 122 is flat and it stands also perpendicularly to the longitudinal axis A. The diameter of the cylindrical outer surface 137 of the flange is chosen in equal manner, as it is previously described in connection with the outer surface 133 of the first end piece 112 .

In the outer surface of the main body 121 a first circular and projecting step 140 is carried out, which adjoins directly the flange. This step 140 has walls 141 and 142. The first wall 141 has the form of a flat ring and it is that one front surface of the flange which faces the inside of the support. This ring surface 141 forms with the longitudinal axis A an angle, which is smaller than 90 degrees, whereby this wall 141 falls against the outside. The outer edge of this ring wall 141 lies in the outer surface 137 of the flange 121. This ring wall 141 extends practically parallel to the ring wall 107 of the main body 127 of the first terminating or closing device 125. A second seal ring 138 is arranged between the ring surface 141 and the lower front surface 152 of the main body 150 of the lower terminating or closing device 126. This second seal ring 138 is shaped in the same manner as the first seal ring 135. To the inner edge of the ring surface 141 the second wall 142 of this step 140 adjoins. This second step wall 142 is cylindrical and it extends away from the ring surface 141, in fact towards the inside of the support and it runs parallel to the longitudinal axis A.

To that one end of the cylinder wall 142, which is averted from the first ring surface 141, a second circular and projecting step 145 adjoins, whereby this step 145 has walls 146 and 147, standing rectangular to each other. The first wall 146 of this second step is annular and it lies at the end of the cylinder wall 142 of the first step 140. The second wall 147 of the second step 145 is cylindrical and the diameter of this cylinder wall 147 is smaller than that diameter of the cylinder wall 142 of the first step 140. This end piece 113 has also an inner front surface 148, which adjoins the end of the cylinder wall 147 of the second step 145.

The main body 150 of the second or lower terminating device 126 has also the form of a thick walled tube piece. However the inside of this tube piece is provided with circular, hollow and concentrically arranged steps. Through the bore 153 in this main body 150 the piston rod 5 goes through with a considerable clearance. This tube piece 50 has a first or an upper front surface 151 and a second or a lower front surface 152. The outer diameter of the upper front surface 151 is chosen in such a way that this interior end portion of the main body 150 can lie in the interior part 10, as this was described in connection with FIG. 2.

To the upper front surface 151 the already mentioned cylindrical interior surface 153 of this main body 150 adjoins, which is placed in a considerable distance from the piston rod 5.

To the lower or toward the outside directed end of this cylindrical surface 15, a first step 155 of this main body 150 adjoins having a first wall 156 and a second wall 157. The first wall 156 has the form of a flat ring and it forms with the longitudinal axis A an angle, which is smaller than 90 degrees. This wall 156 falls towards the outside and it can run practically parallel to the ring wall 141 on the main body 121 of the lower end piece 113. To the inner edge of the ring surface 156 the second wall 157 of this step 155 adjoins. This second step wall 157 is cylindrical, it runs parallel to the longitudinal axis A and extends away from the ring surface 156, in fact against the end piece 116. The diameter of this cylinder wall 157 is chosen in such a way, that the projecting step 145 on the end piece 116, which is laterally limited by the cylinder wall 147, can come in into this hollow step 155.

In a cavity in this end portion of the casing 1, which is laterally limited by the cylinder wall 157, an annular seal 159 is placed. The piston rod 5 goes through this seal 159, whereby this seal 159 rests on this piston rod 5 in a fluid tight manner. The cylindrical outer surface of this sealing ring 159 rests on the cylinder wall 157. The diameter of said outer surface on the ring seal 159 is bigger than the diameter of the inner cylinder wall 153 of the main body 150. Consequently, the ring seal can not come into the interior part 10.

To the free end of the second cylinder wall 157 in the end piece 150 a second, circular and hollow step 160 adjoins. This step 160 has rectangularly to each other standing walls 161 and 162. The first wall 161 of this second step 160 is annular and the second wall 162 is cylindrical. The diameter of that cylinder wall 162 is chosen in such a way, that the cylinder wall 142 of the first, projecting step 140 on the end piece 116 can come in into the cylinder wall 162 of the second hollow step 160 on the main body 160. The free end of that cylinder wall 162 rests in the lower front surface 152 of this main body 150. The length of this second cylinder wall 162 is chosen in such a way, that the sealing ring 135 can be compressed between the ring surfaces 141 and 162 to such extent, that its material adheres fluid tight to the interior surface 7 of the casing 1.

This support can be manufactured in the manner described in the foregoing. FIG. 7 shows this support in the assembled condition. From this FIG. 7 is among other things also apparent, what form the cross section of the sealing rings 135 and 138 gets after compressing the interior components of the support.

What is claimed is:

1. Adjustable length support which can be used especially on chairs, tables or the like, comprising a substantially tubular casing (1) having components arranged in an interior of the casing, at least one seal member sealing a gap in the support, wherein said gap is part of a hollow space in the support, the seal member being placed in said hollow space, the hollow space being constructed in such a manner that at least one dimension thereof can be changed, wherein before said dimension of the hollow space is changed, the at least one dimension of the hollow space is larger than or the same as one of the dimensions of the seal member and that a change of the hollow space is chosen so that the seal member seals said gap after the dimension of the hollow space has been changed, wherein ring shaped stops (15, 16) are provided at the respective end portions of the tubular casing (1), a main body (17) of the stop (15, 16) has an outwardly curved cross section so that a cavity in the stop (15, 16) defines said hollow space, the main body (17) of said stop (15, 16) having two flanks, one of said flanks being in one piece with the tubular main body (2) of the casing (1) and another of the flanks (18) of the stop (15, 16) standing freely in a muzzle of the casing (1) and being directed towards the interior of the casing (1), an end piece (12, 13) being accommodated in each of the respective end portions of the casing (1), an outer front surface (34) of the end piece (12, 13) being oriented toward the freely standing flank (18) of the corresponding stop (15, 16), and a seal member (35, 65, 70, 80) being placed between the freely standing flank (18) of the stop (15, 16) and the end piece (12, 13), wherein said dimension of the hollow space which can be changed is a dimension thereof which extends parallel to a length axis A of the support, wherein the seal (65) is a ring and a circular groove (63) is provided on the outer front surface (34) of the end piece (12) under a front surface (19) of the freely standing flank (18) of the stop (15), wherein the seal (65) lies in said circular groove (63).

2. A support according to the claim 1, wherein the seal (35) is a ring, the ring (35) resting on a flat surface of the outer front surface (34) of the end piece (12, 13) and the seal (35) being placed in an interior of a convexity (17) of the main body of the stop (15, 16).

3. A support according to claim 1, wherein said circular groove (63) has side walls that diverge towards a bottom of the groove (63) so that a top opening of the groove is wider than a bottom of the groove.

4. A support according to claim 3, wherein the seal (65) has a rectangular cross section.

5. A support according to claim 4, wherein a width of the seal (65) is equal to a width of the circular groove (63).

6. A support according to claim 4, wherein a width of the circular groove (63) is larger than a width of the front surface (19) of the freely standing flank (18) of the stop (15) and a width of the seal (70) is less than a width of the bottom (71) of the groove (63).

7. A support according to claim 1, wherein a middle part (74) of the end piece (73) is tubular shaped and has a smaller outer diameter than the casing (1), the end section of the middle part (74) being provided with a flange (75) projecting from an outer wall of the middle part (74), the circular groove (63) being provided in a front surface (77) of said flange (75) and the seal (65) engaged in said circular groove (63).

8. A support according to claim 1, wherein the seal (80) has a longitudinal sectional view which is substantially T-shaped, a first part (81) of the T-shaped seal (80) being formed as a tube which engages a piston rod (5) of the support, a second part (82) of the T-shaped seal (80) projecting radially from the first part (81) of the seal (80) and the front surface (19) of the freely standing flank (18) of the stop (16) being pressed against an outside surface of the second part.

9. A support according to claim 1, having an end piece (112, 113) at respective end portions of the casing (1) and having closing devices (125, 126) each of the closing devices being located at the respective end portions of the tubular casing (1) facing the interior of the support, the hollow space being formed as a first circular recess (105), wherein the recess (105) is located in an area of an outer edge of one front surface (123) of one of the closing devices (125) which faces an assigned end piece (112), the dimension of the recess (105) which can be changed being a dimension thereof which extends parallel to the length axis A of the support, said recess (105) having a cylindrical wall (106) and an annular wall (107), the seal member (135) being formed as a sealing ring lying on said annular wall (107) and surrounding the cylindrical wall (106) and the outer diameter of said seal (135) being smaller than an interior diameter of the casing (1) before said dimension is changed.

10. A support according to claim 9, wherein a second annular recess (101) is provided in the one front surface (136) of the end piece (112) facing a corresponding closing device (125), the second recess (101) being provided in the area of the interior edge of the tubular end piece (112); the second recess (101) having a first and second wall (102, 103) the first wall (102) being cylindrical, an outer margin of the first cylindrical wall (102) lying in the front wall (136) of the end piece (112), the second wall (103) being annular one margin of the second wall (103) adjoining an interior margin of the first wall (102), the other margin of the second wall (103) adjoining the bore (132) in the end piece (112), a remaining section of said front surface (135) of the end piece (112) stands perpendicular to the main axis A and has a shape of a flat ring, and a diameter of the first wall (102) of the second recess (101) corresponds to a diameter of the cylindrical wall (106) of the first annular recess (105) so that said annular front surface (136) of said end piece (112) can enter the first annular recess (105) and squeeze the annular seal (135) in the recess (105).

11. A support according to claim 1, having an end piece (112, 113) in respective end portions of the casing (1) and having closing devices (125, 126), each of the closing devices being located at the respective end portions of the tubular casing (1) facing the interior of the support, wherein the hollow space is formed as a first circular recess (140) in the front surface (148) of the end piece (113) facing a corresponding closing device (126), said first circular recess (140) being located in an area of an outer side or outer edge of said front surface (148) and having an annular wall (141) and a cylindrical wall (142) which stand rectangularly to each other, the cylindrical wall (142) standing at a distance from the interior side (7) of the tubular shaped main body of the casing (1), an outer margin of the annular wall (141) lying in the outer side of the end piece (113), an interior margin of the annular wall (141) adjoining the interior margin of the cylindrical wall (142), the seal being a sealing ring (138) placed in said circular recess (140), the seal ring (138) lying on the annular wall (141) and surrounding the cylindrical wall (142), and outer diameter of said sealing ring (138) being smaller than the interior diameter of the casing (1) and the dimension of the hollow space (140) which can be changed being a dimension thereof which extends parallel to the length axis A of the support.

12. A support according to claim 11, wherein a second annular recess (160) is placed in the one front surface (152) of the closing device (126), facing a corresponding end piece (113), the second recess (160) lying in the area of the interior edge of the closing device (126) and having two standing walls perpendicular to each other (161, 162), one of the walls (161) being annular, the other of the walls (162) being cylindrical and being arranged at a distance from the wall of the bore in the closing device (126), the outer edge of the second wall (162) lying in said front surface (152) of the closing device (126) and the diameter of the cylindrical wall (162) of the second recess (160) corresponding to a diameter of the cylindrical wall (142) of the first recess (140) in the end piece (113), so that said annular front surface (152) of said closing device (126) can enter the first recess (140) and squeeze the seal (138) placed herein.

13. A support according to claim 9, wherein the axial length of cylindrical walls (102, 106 or 142, 162) which can glide telescopically one into another is chosen in such a way that the seal (135 or 138) is compressed between ring shaped surfaces (107, 136, 141, 152) to such extent that a part of the seal projects out from the recess (105, 140) and adheres fluid tight to the interior surface (7) of the casing (1).

14. A support according to claim 9, wherein the annular wall (107, 141) of the recess (105, 140), on which the seal (135, 138) rests, extends inclined with respect to the main axis A of the support and that the wall (107, 141) falls towards the outside.

15. A support according to claim 9, wherein the outer diameter of the seal (135, 138) before assembling of the support is equal to or smaller than an outer diameter of a component (113, 125) of the support in which the recess (105, 140) for receiving the seal is carried out.

16. A process for manufacturing the support according to claim 1, wherein a first end portion of the tubular casing (1) is provided with a stop (15, 16, 115, 116), and comprises the steps of:

putting the components of the support into the casing (1) through a second end portion of the casing (1), putting said components into the casing (1) in that order in which they are to be arranged in the casing (1), setting a tool onto an end piece standing in an opened muzzle of the casing (1), exerting a pressure on said tool and consequently also on the components of the support placed in the interior of the casing (1), whereby the pressure is so great, that seal members (35) are compressed to such extent that a part of material thereof projects from the hollow space and comes to rest fluid tight on an interior side (7) of the casing (1) and the pressure closes the second end portion on the second end portion of the casing.

17. The process according to the claim 16, wherein the components of the support are brought into the casing (1) individually or already assembled together.

18. The process according to the claim 16, wherein the end portions of the casing (1) is provided with the stops by flanging of the end portions of the casing (1).

19. The process according to the claim 16, wherein said tool is tubular shaped, the tool surrounds a pressure bolt (3) or a piston rod (5) of the support and the tool acts on the freely standing surface (34) of said end piece between the piston rod (5) and the flank (18) of the stop.

20. The process according to the claim 18, wherein reshaping of the second stop takes place up to such a depth, that the front surfaces (19) of the freely standing flanks (18) at the stops (15, 16) obtain such a distance from each other, that the inner parts of the support and said seals are compressed between these flanks (18).

* * * * *